Figure 2A:
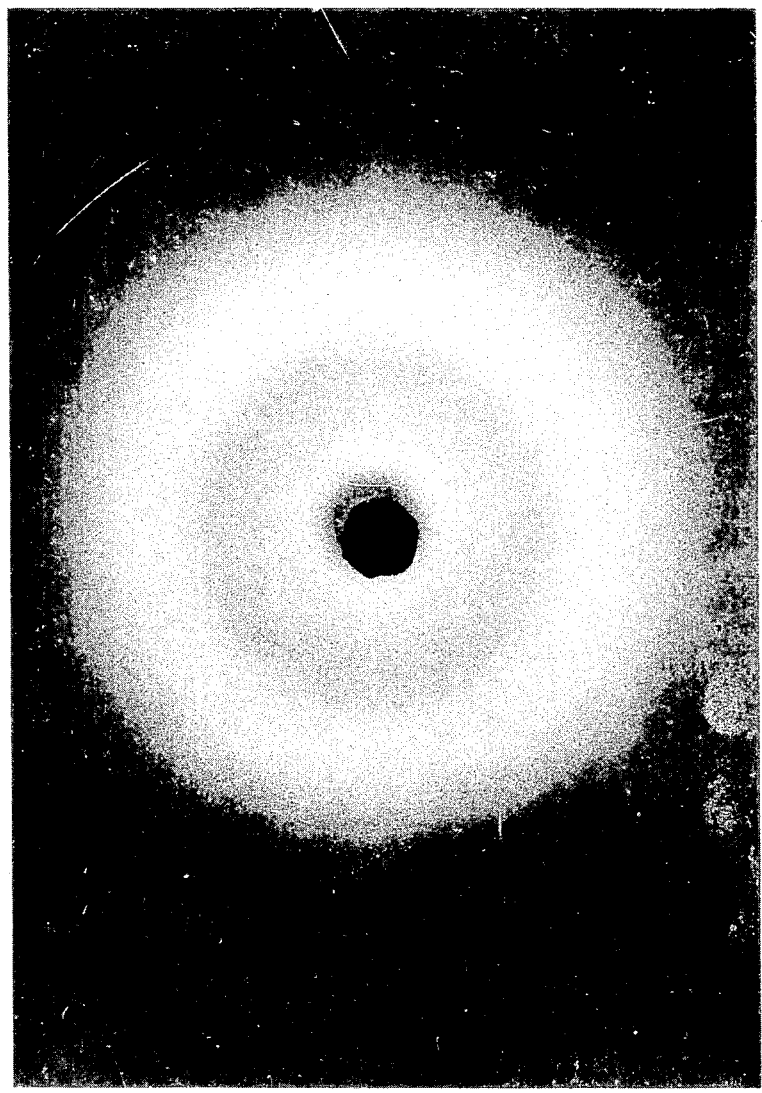

United States Patent [19]
Allen et al.

[11] Patent Number: 4,736,002
[45] Date of Patent: Apr. 5, 1988

[54] NOVEL PROPYLENE POLYMERIZATION PROCESS

[75] Inventors: George C. Allen; Brian J. Pellon; Michael P. Hughes, all of Odessa, Tex.

[73] Assignee: El Paso Products Company, Odessa, Tex.

[21] Appl. No.: 880,456

[22] Filed: Jun. 30, 1986

[51] Int. Cl.$^4$ .................... C08F 4/02; C08F 210/16
[52] U.S. Cl. ............................ 526/125; 502/132; 502/134; 526/153; 526/348; 526/348.6; 526/906
[58] Field of Search ................................ 526/125

[56] References Cited

U.S. PATENT DOCUMENTS

| | | | |
|---|---|---|---|
| 3,789,036 | 1/1974 | Longi et al. | 526/125 |
| 4,175,171 | 11/1979 | Ito et al. | 526/125 |
| 4,234,710 | 11/1980 | Moberly et al. | 526/125 |
| 4,314,911 | 2/1982 | Giannini et al. | 526/125 |
| 4,322,514 | 3/1982 | Miyoshi et al. | 526/125 |

*Primary Examiner*—Edward J. Smith
*Attorney, Agent, or Firm*—Fred S. Valles; Margareta LeMaire

[57] ABSTRACT

A novel process for the production of substantially amorphous interpolymers of propylene, ethylene and optionally a third alpha-olefin comonomer having between 4 and 8 carbon atoms per molecule is disclosed. The polymers have properties which make them applicable for use, e.g., as hot melt adhesives and as blending components in roofing materials.

10 Claims, 4 Drawing Sheets

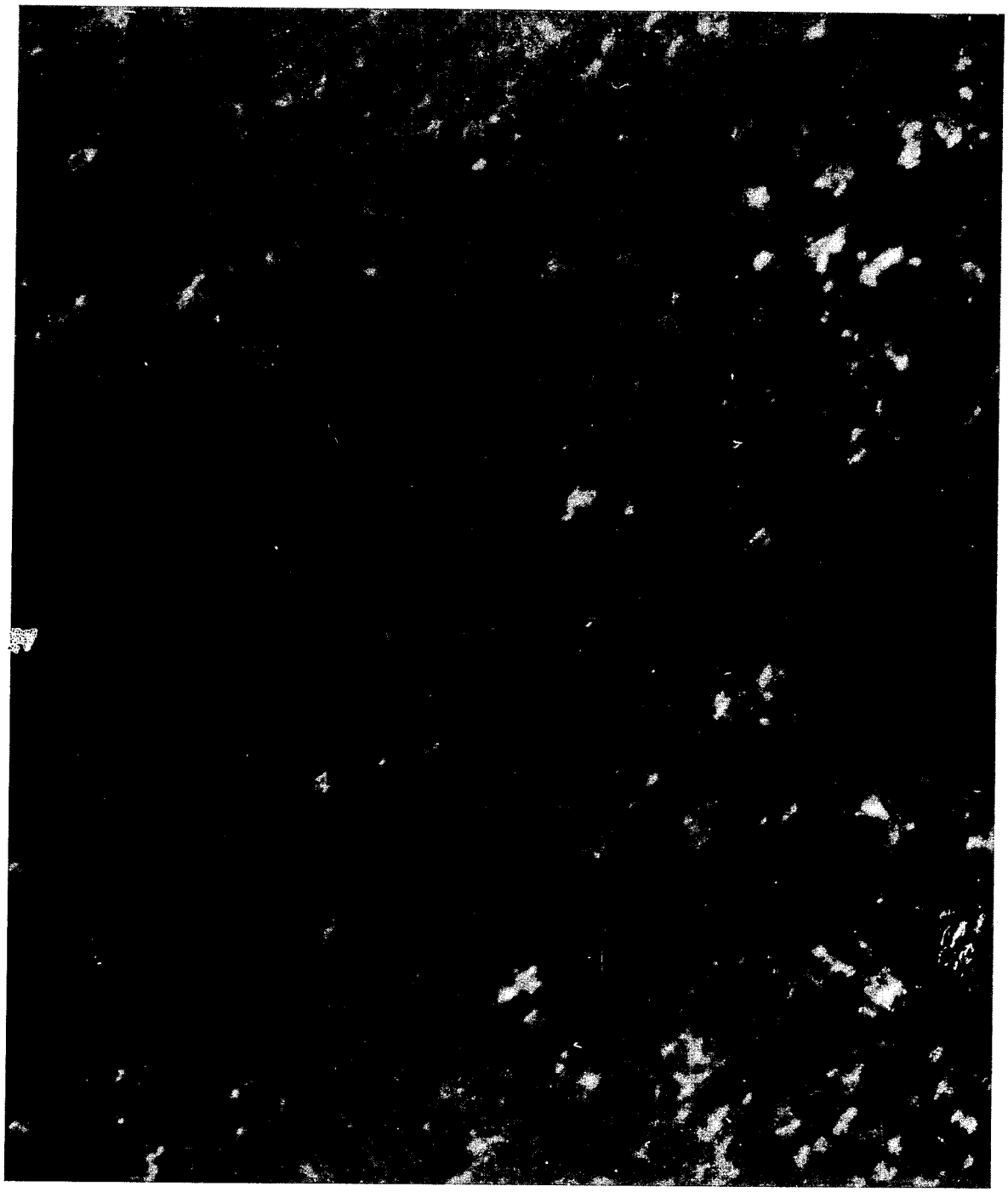
FIG.IA

FIG.IB

NOVEL PROPYLENE POLYMERIZATION PROCESS

This application is related to copending application Ser. No. 880,453 filed June 30, 1986, which pertains to the novel polymer obtained by the process of this invention.

BACKGROUND OF THE INVENTION

In the manufacture of proplene homopolymers and copolymers, conventional polymerization techniques using unsupported catayst result in the simultaneous production of substantial quantities of atactic polymer in addition to the desired product of high crystallinity and isotacticity. Various methods have been employed for the purfication and separation of these two polymers. The byproduct, i.e. the atactic polymer of low crystallinity is being utilized commercially as a component in various adhesive compositions, roofing materials, caulking compounds, etc.

Recently, developments have been made of new catalysts which are highly active and more stereospecific than the afore-mentioned conventional catalysts. The proportions of atactic polymer in the polymers produced employing these catalysts are substantially reduced and therefore the polymer product generall does not require any purification for removal of the atactic or low crystalline polymer. Because of the rapid adaptation of existing polymer facilities to the use of these new catalysts, there has been generated a serious shortage of low-crystalline, atactic polymers.

It is therefore an object of the present invention to provide a novel process for the production of substantially amorphous polymers of propylene and ethylene.

It is another object of the present invention to provide a process for the production of a novel amorphous polymer of propylene and ethylene and optionally a third alpha-olefin comonomer having improved physical properties.

THE FIGURES

Figure 2B:

FIGS. 1A and 1B are comparative hot stage micrographs of two different polymers and FIGS. 2A and 2B are films of the same samples exposed to wide angle x-ray diffraction.

THE INVENTION

In accordance with the present invention there is provided a process for the production of substantially amorphous interpolymers which comprises polymerizing from about 65 to about 90 wt % propylene, from about 10 to about 30 wt % ethylene and from about 0 to about 15 wt % of a $C_4$-$C_8$ alpha-olefin at a temperature between about 130 and about 175° F. and a reactor pressure sufficient to maintain propylene in the liquid phase, in the presence of from about 0.7 mol % to about 3.0 mol % hydrogen based on the monomer feed to the process and employing as catalyst a composition comprised of:

(a) a solid catalyst component produced by the method comprising (i) co-comminuting magnesium halide support base and aluminum trihalide in the absence of added electron donor and (ii) then co-comminuting the product of step (i) with titanium tetrahalide in the absence of added electron donor; and (b) a co-catalyst component comprised of a mixture of from about 15 to about 90 mol % of trialkylaluminum having from 1 to 9 carbon atoms in each alkyl group and about 85 to about 10 mol % of an alkylaluminum halide having at least one halide group per molecule in a sufficient quantity to provide Ti ratio in the range from about 50:1 to about 600:1;

and recovering a substantially amorphous random interpolymer having a tacticity index m/r ranging between about 3 and about 5 as determined by $^{13}C$ NMR spectra. In the absence of the third $C_4$-$C_8$ alpha-olefin comonomer, the m/r ratio will range between about 3 and about 4. When a third monomer is used the preferred amount is between about 5 and about 15 wt % based on the total polymer weight. Preferably, the halides are chloride, the alkyls are ethyl groups and the alkylaluminum halide contains one halide group. The invention will be described hereinafter in connection with the preferred embodiments of the catalyst system.

Although the polymerization can be carried out in a batch reactor, it is preferred to utilize a continuous process to achieve the most random incorporation of the comonomer(s). Usually, pressures in the range between about 400 psig and about 550 psig are suitable for maintaining propylene in liquid phase, the preferred temperature is between about 150° F. and about 160° F.

The hydrogen is added to the polymerization reactor for control of polymer molecular weight and other properties at concentrations generally about 7 to 10 times the amount conventionally used in the manufacture of isotactic polymer. Moreover, as the ethylene content of the interpolymer is increased it is necessary to increase the hydrogen concentration in the reactor to maintain a constant melt viscosity. As an example, for a 100% increase in ethylene content about a 50 to 150% increase in hydrogen is required. The concentration of hydrogen in the total feed to the reaction zone preferably ranges between about 1.2 and about 2.5 mol %.

The solid, supported catalyst component should have a molar ratio of magnesium chloride to aluminum chloride of about 8:0.5–3.0 and preferably about 8:1.0–1.5.

The molar ratio of magnesium chloride to titanium tetrachloride is between about 8:0.1–1.0 and preferably about 8:0.4–0.6. A critical feature of the solid supported catalyst component is that no electron donor compounds should be used in any of the catalyst manufacturing steps. Also, the polymerization process using the catalyst should be carried out in the absence of added electron donors.

Any of the general methods described in U.S. Pat. Nos. 4,347,158 and 4,555,496 (hereby incorporated by reference in this application) can be used in preparing the solid supported catalyst component except that these methods must be modified to exclude the use of electron donor compounds. Briefly, the modified method involves co-comminuting magnesium chloride and aluminum trichloride in the absence of an electron donor and then co-comminuting the catalyst support so formed with titanium tetrachloride, also in the absence of an electron donor.

The solid catalyst component is used in conjunction with an organoaluminum co-catalyst, which, as stated above, is a mixture of triethylaluminum and diethylaluminum chloride, the triethylaluminum content ranging between about 15 and about 90 mol percent in the total organoaluminum component. At lower than 15% triethyle aluminum concentrations, the polymer productivity is drastically reduced and diethylaluminum chloride alone fails completely to promote polymerization. At higher than 90 mol % triethylaluminum some of the physical properties of this polymer are affected in an undesirable manner. The use of diethylaluminum chloride is not for the purpose of promoting polymerization but very importantly, to impart to the catalyst system the ability to produce polymer with desirable properties. The preferred co-catalyst is a mixture containing from about 40 to 60 mol % triethylaluminum. The molar radio of total organoaluminum co-catalyst to titanium-containing catalyst component, i.e. Al/Ti ratio should range between about 50:1 and about 600:1, preferably between about 90:1 and about 300:1.

The polymerization is carried out in a stirred reactor at average residence times between about 1 hour and about 3 hours. Sufficient catalyst quantities are fed to the reactor to result in a polymer content in the reactor slurry of from about 30 wt % to about 60 wt %. The reactor effluent is withdrawn from the reactor, and unreacted monomer and hydrogen is flashed from the product polymer.

The specific catalyst used in the process of this invention has the ability to produce propylene units in the polymer with little or no control of the stereochemistry, and also to incorporate ethylene as randomly as possible to provide maximun disorder in the polymer chain.

The products of the process of this invention have a tacticity index m/r between about 3 and 5. This is determined directly by $^{13}C$ Nuclear Magnetic Resonance (NMR). The "m" and "r" describe the stereochemistries of pairs of contiguous propylene groups bonded to one or more ethylene groups, "m" referring to meso and "r" to racemic. An m/r ratio of 1.0 describes a syndiotactic polymer and an m/r ratio of 2.0 a truly atactic material. An isotactic material theoretically will have a ratio approaching infinity and many by-product atactic polymers have sufficient isotactic content to result in ratios of 50 and above. It has been found that the m/r ratio substantially agrees with the number average sequence length n̄ of like groups i.e. meso and racemic groups in case of propylene homopolymer produced under the same conditions as the random copolymer, except for the absence of ethye lene in the feed. Thus, it was established that the tacticity is independent of comonomer content in the polymer. Also, the comonoer such as the ethylene is distributed throughout the polymer molecule in the most random fashion. The method used in calculating n̄ for homopolymer is disclosed in J. C. Randall, J. POLYM. SCI., POLYM. PHYS. ED., 14, 2083 (1976). The tacticity index m / r is obtained by inverting the r'/m' ratio calculated according to the method devised by H. N. Cheng, MACROMOLECULES, 17, 1950 (1984).

The interpolymers are unique in that although they exhibit a birefringent granular spherulitic structure when examined by hot stage microscopy, they are substantially amorphous. Usually, truly amorphous materials will show no structure by this method. The formation of these granules upon cooling implies that there is enough tacticity for short portions of the chain, i.e. ordered arrays of monomer without long range order, which would tend to form crystallites. The average length of the granules range between about 15 and about 50 microns, although occasionally larger grain sizes might be obtained. The hot state microscopy method is described in "The Light Microscopy of Synthetic Polymers" D. A. Helms, ley in Oxford University Press, Oxford, England, 1984. The determinations are made by heating the samples on glass slides in a hot stage to 170° C. and then slowly cooling them by turning off the heaters, while viewing the samples through a crossed polarizer. Photomicrographs (400×) are made of the cooled samples, and measurements are made of the largest dimension (=the length) of the granules. FIG. 1A shows a hot stage photomicrograph of a typical interpolymer of this invention (Example 3 of Table 1), FIG. 1B shows that of commercially available product (Commercial Sample C of Table 2) believed to be a purified atactic by-product polymer.

The interpolymers exhibit no significant crystallinity under wide angle x-ray diffraction ("X-Ray Diffraction Methods In Polymer Science" L. E. Alexander, Krieger Publishing Company, Huntington, New York, 1979). In these tests the samples are placed between two thin films of Mylar ® and placed at the exit Collimator of the x-ray tube. A beam stop is used to block out the primary beam and flat films record the scattered radiation with a sample-to-film distance of 30 mm. The presence of no more than 2 discrete concentric rings superimposed on the diffuse halos on the exposed film indicates the presence of no significant polymer crystallinity.

FIG. 2A shows an exposed film using the same interpolymer as in FIG. 1A, while FIG. 2B is an exposed film of the same samples as of FIG. 1B. As seen in FIG. 2A, there are no rings present indicating an amorphous nature of the polymer sample, while in FIG. 2B there are 4 clearly defined rings, which indicate a high degree of crystalline order of the sample.

The novel polymer has a very low heat of fusion, typically less than about 0.6 cal/g, as determined by Differential Scanning Calorimetry techniques (DSC), a further indication of the amorphous nature of the polymer and the lack of significant crystallinity in the polymer structure.

Various additives can be incorporated into the polymer, such as antioxidants, U.V. stabilizers, pigments, etcetera.

The polymer products of the process of this invention have excellent properties making them useful in a variety of applications, such as for adhesives, caulking and sealing compounds, roofing compositions and others. By varying the comonomer content in the polymer and hydrogen addition to the reactor, it is possible to tailor the properties for any desired application. The important product properties include melt viscosity, ring and ball softening point, needle penetration and open time.

The melt viscosity at 375° F. is determined by ASTM test method D-3236 using a Brookfield RVT Viscometer and a #27 spindle. Hydrogen is used to control molecular weight and thus melt viscosity. It has been found that at increased ethylene content more hydrogen is required to maintain a certain viscosity level. For hot melt adhesives the desired viscosity range is between about 1000 and about 5000 cps at 375° F., while for other applications such as bitumen-modified product, the polymer component should have a viscosity above 5000 cps, preferably in the range between about 10,000 and about 25,000 cps.

The ring and ball softening point determinations are carried out using ASTM E-28 test method. The variables affecting the softening point are ethylene content of the polymer and the triethylaluminum concentration in the organoaluminum co-catalyst used in the polymerization process. A decrease in the ethylene content as well as in diethylaluminum chloride concentration in the cocatalyst both cause an increase in the ring and ball softening point. The preferred range for this property is between about 235° F. and about 270° F. for the hot melt adhesive applications.

Needle penetration is another test which measures the softness of the material, in this case by the resistance to penetration according to ASTM test method D-1321. Typically, the penetration ymers of this invention range between values of the interpolymers of this invention range between 25 and about 75 dmm (1 dmm=0.1mm). The same process variables affect this property as in the case of ring and ball softening point.

Perhaps the most important test of a hot melt adhesive is the open time. This test is an indication of the elapsed time available between adhesive application to kraft paper and bonding of a kraft paper laminate. This is a very important property for the user, as he must know how soon after applying the adhesive he must add the second sheet of paper. In this test, an 8½"×11" sheet of kraft paper, rough side-up is taped to a drawdown plate. A polymer sample is heated to 375° F. along with a Bird drawdown applicator. When at temperature, the applicator is placed at the top of the kraft paper and a small puddle of molten polymer is poured near the edge. The polymer is drawn into a smooth film, and as soon as the bottom of the paper is reached, a stopwatch is started. At 10 second intervals, precut strips of kraft paper (rough side down transverse machine direction) are placed across film and pressed into place with a rubber roller. After the last strip is applied, and a subsequent waiting period of 5 minutes, the strips are removed in a smooth, brisk motion. The open time is defined as the longest time when 90% or more of the fiber remains. The open times should preferable range between 10 and 60 seconds.

An additional benefit of the polymers of this invention is they contain extremely small quantities of catalyst residues because of the very large productivity rates of the specific catalyst used in the polymerization. There is no need to remove these small amounts of catalysts from the polymer.

The following examples illustrate the invention.

EXAMPLES 1-8

Polymers were prepared in large scale continuous pilot plant operations, wherein monomers, hydrogen and catalyst components were separately and continuously charged to a stirred reactor, the total monomer feed rate corresponding to about a 2 hour residence time in the reactor. The organoaluminum compound of the catalyst system was a heptane solution of an equimolar mixture of triethylaluminum (TEA) and diethylaluminum chloride (DEAC). The solid supported titanium tetrachloride catalyst component had a titanium content of about 2.5 wt % and was prepared by a modification of the preferred technique disclosed in U.S. Pat. No. 4,347,158 i.e., modified only in that all process steps were carried out in the absence of any electron donor compounds. The solid catalyst component was pumped into the reactor as a 10 wt % mixture in a blend of petrolatum and mineral oil in a 50/50 weight ratio. The two catalyst components were added at rates directly proportioned to the polymer production rates and in amounts sufficient to maintain the polymer solids concentration in the reactor slurry at values usually in the range between about 40% and about 60%. The catalyst productivity (lb polymer/lb of Ti-catalyst component) was calculated in each case from the polymer slurry withdrawal rate, solids content in the slurry and the titanium catalyst addition rate.

TABLE 1

| EXAMPLE NO. | 1 | 2 | 3 | 4 | 5 | 6 | COMP 7 | COMP 8 |
|---|---|---|---|---|---|---|---|---|
| Reactor Temp. - °F. | 157 | 150 | 154 | 154 | 157 | 142 | 155 | 155 |
| Reactor Press. - psig | 456 | 434 | 466 | 484 | 491 | 495 | 448 | 442 |
| Propylene - lbs/hr | 111 | 111 | 111 | 111 | 102 | 111 | 112 | 124 |
| Ethylene - lbs/hr | 8.8 | 9.0 | 12.0 | 12.0 | 8.5 | 12.9 | 5.0 | — |
| Hydrogen - lbs/hr | 0.14 | 0.05 | 0.06 | 0.10 | 0.06 | 0.14 | 0.10 | 0.07 |
| Al/Ti mol ratio | 311 | 289 | 301 | 299 | 263 | 291 | 299 | 533 |
| Reactor Solids - wt % | 60.5 | 47.7 | 51 | 51 | 32 | 38 | 61 | 59 |
| Productivity - lbs/lb Catalyst | 55,420 | 34,390 | 33,520 | 35,500 | 23,950 | 30,260 | 37,440 | 20,680 |
| Ethylene Content - wt % | 12.2 | 13.5 | 14.3 | 15.5 | 17.5 | 25.7 | 4.0 | 0 |
| m/r Ratio (or ñ) | 3.1 | 3.3 | 3.8 | 3.7 | 3.7 | 3.5 | 3.2 | 3.3 |
| Average Granule Length - Microns | 15 | 20 | 12 | 18 | 25 | 15 | 38 | 50 |
| No. of Rings (Wide angle X-ray) | 0 | 2 | 0 | 2 | 0 | 0 | 1 | 4 |
| $\Delta H_F$ - cal/g (DSC) | 0.50 | 0.50 | 0.27 | 0.33 | 0.16 | 0.00 | 1.79 | 4.37 |
| Melt Viscosity @ 375° F. - cps | 3,000 | 15,000 | 7,750 | 3,780 | 9,210 | 7,900 | 2,100 | 2,800 |
| Open Time - secs | 10 | 20 | 20 | 30 | 20 | >60 | <10 | 0 |
| Ring and Ball Softening Point - °F. | 266 | 257 | 252 | 251 | 253 | 237 | 279 | 304 |
| Needle Penetration - 0.1 mm | 37 | 28 | 43 | 45 | 41 | 71 | 17 | 8 |

TABLE 2

| PRODUCT PROPERTY | Ethylene wt % | m/r or ñ | Granule Length | No of Rings X-ray | $\Delta H_F$ - cal/g | Melt Visc. @ 375° F. cps | Open Time Secs | Soft Pt. °F. | Needle Pen. 0.1 mm |
|---|---|---|---|---|---|---|---|---|---|
| Example | | | | | | | | | |
| 1 | 12.2 | 3.1 | 15 | 0 | 0.50 | 3,000 | 10 | 266 | 37 |
| 2 | 13.5 | 3.3 | 20 | 2 | 0.50 | 15,000 | 20 | 257 | 28 |
| 3 | 14.3 | 3.8 | 12 | 0 | 0.27 | 7,750 | 20 | 257 | 28 |
| 4 | 15.5 | 3.7 | 18 | 2 | 0.33 | 3,780 | 30 | 251 | 45 |
| 5 | 17.5 | 3.7 | 25 | 0 | 0.16 | 9,210 | 20 | 253 | 41 |
| 6 | 25.7 | 3.5 | 15 | 0 | 0.00 | 7,900 | >60 | 237 | 71 |
| Comp. 7 | 4.0 | 3.2 | 38 | 1 | 1.79 | 2,100 | <10 | 279 | 17 |
| Comp. 8 | 0 | 3.3 | 50 | 4 | 4.37 | 2,800 | 0 | 304 | 8 |
| Commercial Sample | | | | | | | | | |
| A* | 5.0 | — | 0 | 4 | 0.10 | 22,000 | 60 | 176 | 13 |
| B | 8.6 | 2.1 | 33 | ? | 0.10 | 11,000 | 40 | 284 | 29 |

TABLE 2-continued

| PRODUCT PROPERTY | Ethylene wt % | m/r or $\bar{n}$ | Granule Length | No of Rings X-ray | $\Delta H_F$-cal/g | Melt Visc. @ 375° F. cps | Open Time Secs | Soft Pt. °F. | Needle Pen. 0.1 mm |
| --- | --- | --- | --- | --- | --- | --- | --- | --- | --- |
| C | 3 | 2.1 | 45 | 4 | 1.04 | 1,300 | >60 | 287 | 43 |
| D | 8.0 | 1.6 | 0 | 5 | 0.00 | 250 | — | — | — |
| E | 22.1 | 49.0 | 5 | 2 | 0.93 | >500,000 | — | — | — |
| F | 17.1 | 99.0 | 18 | 4 | 0.75 | 56,000 | — | — | — |
| G | 0 | 2.7 | 90 | 2 | 3.81 | 2,000 | 5 | 314 | 10 |
| H | 0 | 2.9 | 130 | 2 | — | 2,400 | 0 | 295 | 12 |
| I | 0 | 2.1 | 98 | 3 | 0.44 | 500 | 0 | — | — |
| J | 0 | 2.0 | 18 | 4 | 0.00 | 100 | — | — | — |
| K | 0 | 2.1 | 92 | 2 | 1.38 | 3,200 | — | — | — |
| L | 0 | 2.5 | 148 | 3 | 1.12 | 900 | — | — | — |
| M | 0 | 2.7 | 170 | 7 | 4.21 | 4,300 | — | — | — |
| N | 0 | 2.5 | 75 | 7 | 0.50 | 250 | — | — | — |
| O | 0 | 1.9 | 40 | 4 | 0.25 | 350 | — | — | — |

*Terpolymer ethylene/propylene/butene - 1

The product polymer was separated from unreacted monomer, stabilized with Isonox ® 129 and then subjected to testing. Table 1 summerizes the pertinent operating conditions and the results of physical testing. The product characteristics of Examples 1-6 all are the results of operating the process within the claimed limits of this invention, while those of Comparative Examples 7 and 8 reflect the insufficient amount of ethylene in the process i.e. high softening points, low needle penetration, high heat of fusion.

Table 2 lists the physical properties of Examples 1-8 and also of fifteen atactic polymers (Commercial Examples A-O) obtained from various manufacturers in the United States, Europe and Asia. Commercial Sample A is a terpolymer of ethylene, propylene and a major proportion of butene-1, while the remaining samples are either propylene homopolymers or ethylene-propylene copolymers. Samples B, C, G and H are believed to have been produced in processes under conditions deliberately selected to yield relatively large concentrations of atactic polymer in the total polymer product. It is further believed that the atactic portions have subsequently been removed from the isotactic by-product by solvent treatment. Samples D-F and I-O are believed to be atactic polypropylene by-products. None of these commercial samples have the physical properties required of the polymer products of this invention.

EXAMPLES 9 and 10

Both experiments were performed in a 1-liter, jacketed autoclave equipped with a magnetically coupled stirrer. The temperature of the autoclave was controlled by the use of a mixture of equal weights of glycol and water as the heat transfer fluid flowing through the jacket. The temperature of this fluid was controlled by a microprocessor whose temperature indicator was an iron/constantin thermocouple inside the autoclave. With this system, set point temperature could be maintained ±0.2° C. All monomers were polymerization grade, 99.9% pure, and were also passed through molecular sieve beds, as well as beds of copper catalyst for oxygen removal, prior to use. Hydrogen was ultrahigh purity, 99.99% and used as is. Aluminum alkyl solutions were purchased as 25% W/W in normal heptane and were used as is. One wt % catalyst slurries were prepared in degassed mineral oil using catalysts of the same type as that of in Examples 1-8. Prior to each use, the autoclaves were heated to 90° C. with a slow nitrogen purge for 30 minutes. After cooling to 30° C., the nitrogen atmosphere was replaced with a propylene purge. Alkyl solutions and catalyst slurries were prepared in septum vials in dry boxes (nitrogen atmosphere), purged with nitrogen upon removal, and pressurized slightly to avoid contamination. Alkyl solutions and catalyst slurries were introduced into the reactors using hypodermic syringes, previously cleaned with de-ionized water, dried at 120° C., and purged with nitrogen prior to use. In Example 9, 0.34 ml TEA, 0.34 ml DEAC (Al—1.77×10$^{-3}$ mole/l), and 0.58 ml of 1% W/W catalyst slurry (2.5% W/W titanium content) were added to the autoclave. Hydrogen was added to equal a partial pressure of 70 psig. 0.6 liters of propylene was introduced using a sight guage and nitrogen pressure. The reactor content was heated to 60° C. and maintained while stirring at 500 rpm. As soon as the temperature stabilized at 60° C. (5-10 minutes), ethylene was added to the reactor to maintain a constant overpressure of 50 psig greater than the reactor pressure. After 1 hour, the temperature was lowered and excess propylene vented. The ethylene-propylene copolymer was dried under vacuum at 40° C. overnight. Example 10 was carried under the conditions of the previous example except that 0.1 liter of butene-1 and 0.5 liter of propylene was charged to the autoclave instead of the 0.6 liters of propylene of Example 9. The resulting terpolymer was dried as before.

Table 3 lists the pertinent physical properties of the products of Examples 9 and 10.

TABLE 3

| EXAMPLE NO | 9 | 10 |
| --- | --- | --- |
| Ethylene - wt % | 21.1 | 23.3 |
| Butylene - wt % | — | 9.2 |
| m/r | 3.3 | 4.8 |
| Average Granule Length-microns | 22 | 20 |
| No. of Rings - X-ray | 0 | 0 |
| $\Delta H_F$-cal/g | 0.03 | 0.00 |
| Melt Viscosity @ 375° F. cps | 2810 | 3250 |
| Open Time - secs | >60 | >60 |
| Softening Point - °F. | 260 | 237 |
| Needle Penetration - 0.1 mm | 71 | 72 |
| Catalyst Efficiency Kg/g | 41.2 | 34.6 |

COMPARATIVE EXAMPLES 11 and 12

These examples were carried out using the procedure described in connection with Example 9 except for the alkyl co-catalyst addition. In Example 11 0,68 ml TEA was used exclusively while in Example 12 the same amount of DEAC only was added. Table 4 lists the pertinent data of these comparative examples.

TABLE 4

| EXAMPLE NO | COMP. 11 | COMP. 12 |
| --- | --- | --- |
| Co-Catalyst | | |

TABLE 4-continued

| EXAMPLE NO | COMP. 11 | COMP. 12 |
|---|---|---|
| TEA | 100% | — |
| DEAC | — | 100% |
| Catalyst Efficiency Kg/g | 40.0 | 0.0 |
| Ethylene - wt % | 18.1 | — |
| m/r | 4.2 | — |
| Melt Viscosity @ 375° cps | 3700 | — |
| Open Time - secs | >60 | — |
| Softening Point - °F. | 275 | — |
| Needle Penetration - 0.1 mm | 43 | — |

As seen from the above data, the use of 100% TEA instead of a mixture of TEA and DEAC (as in Example 9) resulted in a higher m/r ratio of the polymer product. Also, the softening point and needle penetration values were affected in a detrimental way. The use of 100% DEAC as co-catalyst resulted in no formation of polymer.

It is to be understood that many alterations and modifications can be made to the process of this invention. All such departures are considered within the scope of this invention as defined by the specifications and appended claims.

What is claimed is:

1. A process for the production of substantially amorphous interpolymers which comprises polymerizing from about 70 to about 90 wt. % propylene and from about 10 to about 30 wt. % ethylene at a temperature between about 130° F. and about 175° F. and at a reactor pressure sufficient to maintain propylene in the liquid phase, in the presence of from about 0.7 to about 3.0 mol % hydrogen based on the monomer feed to the process and employing as catalyst a composition comprised of:
   (a) a solid catalyst component produced by the method comprising
      (i) co-communicating magnesium halide support base and aluminum trihalide in a molar ratio from about 8:0.5 to about 8:3 in the absence of added electron donor and (ii) then co-communicating the product of step (i) in the absence of added electron donor with sufficient titanium tetrahalide to provide a molar ratio of magnesium halide to titanium tetrahalide from about 8:0.4 to about 8:1; and
   (b) a co-catalyst component comprised of a mixture of from about 15 to about 90 mol % of trialkylaluminum having from 1 to 9 carbon atoms in each alkyl group and about 85 to about 10 mol % of an alkylaluminum halide having at least one halide group per molecular in a sufficient quantity to provide an Al/Ti ratio in the range from about 50:1 to about 600:1;

and recovering a substantially amorphous, random interpolymer having a tacticity index m/r ranging between about 3 and about 4 as determined by 13C NMR spectra.

2. The process of claim 1 wherein each halide is a chloride, each alkyl is an ethyl group and the alkylaluminum halide is diethylaluminum chloride.

3. The process of claim 2 wherein said pressure is between about 400 psig and about 550 psig and the temperature is between about 150° F. and 160° F.

4. The process of claim 1 wherein said magnesium halide to aluminum trihalide ratio ranges from about 8 1 to about 8:1.5.

5. The process of claim 1 wherein said magnesium halide to titanium tetrahalide molar ratio ranges from about 8:0.4 to about 8:0.6.

6. The process of claim 2 wherein the triethylaluminum content of the co-catalyst mixture ranges between about 40 and about 60 mol %.

7. The process of claim 2 wherein the Al/Ti ratio is maintained between about 90:1 and about 300:1.

8. The process of claim 2 wherein the hydrogen is maintained between about 1.2 and about 2.5 mol % based on the total monomer feed to the process.

9. The process of claim 2 carried out under continuous conditions at an average residence time between about 1 hour and about 3 hours.

10. The process of claim 2 wherein the solids content of the reactor slurry is maintained between about 30 wt % and about 60 wt %.

* * * * *